(12) United States Patent
Ramasubramonian et al.

(10) Patent No.: US 9,716,900 B2
(45) Date of Patent: Jul. 25, 2017

(54) EXTENSIBLE DESIGN OF NESTING SUPPLEMENTAL ENHANCEMENT INFORMATION (SEI) MESSAGES

(71) Applicant: QUALCOMM Incorporated, San Diego, CA (US)

(72) Inventors: Adarsh Krishnan Ramasubramonian, San Diego, CA (US); Fnu Hendry, Poway, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 14/742,573

(22) Filed: Jun. 17, 2015

(65) Prior Publication Data

US 2015/0373374 A1 Dec. 24, 2015

Related U.S. Application Data

(60) Provisional application No. 62/015,110, filed on Jun. 20, 2014.

(51) Int. Cl.
| | | |
|---|---|---|
| *H04N 7/12* | (2006.01) | |
| *H04N 19/70* | (2014.01) | |
| *H04N 19/34* | (2014.01) | |
| *H04N 19/46* | (2014.01) | |
| *H04N 19/30* | (2014.01) | |

(52) U.S. Cl.
CPC ............. *H04N 19/70* (2014.11); *H04N 19/30* (2014.11); *H04N 19/34* (2014.11); *H04N 19/46* (2014.11)

(58) Field of Classification Search
CPC ........ H04N 19/70; H04N 19/30; H04N 19/34; H04N 19/46
USPC ..................................................... 375/240.27
See application file for complete search history.

(56) References Cited

U.S. PATENT DOCUMENTS

2013/0135433 A1* 5/2013 Chen .................. H04N 13/0003
348/43

OTHER PUBLICATIONS

Hannuksela M.M., et al., "AHG9: Operation points in UPS and nesting SEI", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/; No. JCTVC-K0180, Oct. 1, 2012 (Oct. 1, 2012), XP030113062; 5 pages.
International Search Report and Written Opinion—PCT/US2015/036390—ISA/EPO—Sep. 15, 2015.

(Continued)

*Primary Examiner* — Allen Wong
(74) *Attorney, Agent, or Firm* — Procopio, Cory, Hargreaves & Savitch LLP

(57) ABSTRACT

In an example, a method for video coding includes processing a Supplemental Enhancement Information (SEI) Network Abstraction Layer (NAL) unit that comprises one or more SEI message structures in a raw byte sequence payload (RBSP), such that one or more SEI message structure includes at least one nesting SEI message structure having one or more SEI messages. In various embodiments, the SEI NAL unit is processed, and a syntax element, indicative of a number of SEI messages comprised within the at least one nesting message structure, is coded.

30 Claims, 10 Drawing Sheets

(56) References Cited

OTHER PUBLICATIONS

"Joint Draft 10: Scalable Video Coding", 23. JVT Meeting; 80. MPEG Meeting; Apr. 21, 2007-Apr. 27, 2007; San Josa CR ,US; (Joint Video Team of ISO/IEC JTC1/SC29/WG11 and ITU-T SG.16 ), No. JVT-W201, Jun. 8, 2007 (Jun. 8, 2007), XP030007102, ISSN: 0000-0153 abstract; tables 7-5, 7-6 Sections 0.2, 0.3, 3, 7.4.1, Annex G, 567 pages.

Ramasubramonian A K., et al., "HEVCv1/MV-HEVC/SHC HLS : On extensibility of nesting SEI messages", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16 ); URL: http ://wftp3.itu.int/av-arch/ jctvc-site/, No. JCTVC-R0221, Jun. 21, 2014 (Jun. 21, 2014), XP030116520, the whole document.

Sullivan G.J., et al., "Meeting report of the 25th JVT meeting", 25 . JVT Meeting; 82. MPEG Meeting; Oct. 21, 2007-Oct. 26, 2007; Shenzhen , CN; (Joint Video Team of ISO/IEC JTC1/SC29/WG11 and ITU-T SG.16 ), No. JVT-Y200, Oct. 22, 2007 (Oct. 22, 2007), pp. 80,XP030007293, ISSN: 0000-0094 p. 32, point 9.

Second Written Opinion from International Application No. PCT/US2015/036390, mailed May 4, 2016, 4 pages.

\* cited by examiner

EXTENSIBLE DESIGN OF NESTING SUPPLEMENTAL ENHANCEMENT INFORMATION (SEI) MESSAGES

CROSS-REFERENCE TO RELATED APPLICATION

This application claims the benefit of priority to U.S. Provisional Application No. 62/015,110, filed Jun. 20, 2014, which is incorporated by reference herein in its entirety.

TECHNICAL FIELD

This disclosure is generally related to video coding and compression, and more particularly to improving the parsing of nesting supplemental enhancement information (SEI) message structures.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement one or more video coding techniques. The video devices may transmit, receive, encode, decode, and/or store digital video information more efficiently by implementing such video coding techniques.

Video coding techniques include, without limitation, those described in the standards defined by ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264 or ISO/IEC MPEG-4 Advanced Video Coding (AVC) (including its Scalable Video Coding (SVC) and Multiview Video Coding (MVC) extensions), and the relatively new High Efficiency Video Coding (HEVC) standard. The HEVC standard was recently finalized by the Joint Collaboration Team on Video Coding (JCT-VC) of the Video Coding Experts Group (VCEG) of the International Telecommunication Union's Telecommunication Standardization Sector (ITU-T) and the Moving Picture Experts Group (MPEG), formed by the International Organization for Standardization (ISO) and the International Electrotechnical Commission (IEC). The latest working draft (WD) of the HEVC specification, referred to as HEVC WD, is available from phenix.it-sudparis.eu/jct/doc_end_user/documents/17_Valencia/wg11/JCTVC-Q1003-v1.zip. The multiview extension to HEVC, namely MV-HEVC, is also being developed by the JCT-3V. A recent working draft of MV-HEVC WD3 hereinafter, is available from phenix.it-sudparis.eu/jct2/doc_end_user/documents/8_Valencia/wg11/JCT3V-H1002-v5.zip. The scalable extension to HEVC, named SHVC, is also being developed by the JCT-VC. A recent working draft of SHVC and referred to as SHVC WD2 hereinafter, is available from http://phenix.it-sudparis.eu/jct/doc_end_user/documents/17_Valencia/wg11/JCTVC-Q1008-v2.zip.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to improving the parsing of nesting supplemental enhancement information (SEI) message structures. Various techniques described below provide methods and devices for reducing or eliminating parsing errors during the parsing of nesting SEI message structures.

In an embodiment, a method for video coding is disclosed. The method comprises: processing a SEI Network Abstraction Layer (NAL) unit, comprising a raw byte sequence payload (RBSP) that comprises one or more SEI message structures, wherein the one or more SEI message structures comprise at least one nesting SEI message structure having one or more SEI messages; and coding a syntax element indicative of a number of SEI messages comprised within the at least one nesting SEI message structure.

In another embodiment, a device for video coding is disclosed. The device comprises a memory configured to store video data, and a processor in communication with the memory. The processor is configured to: process a SEI NAL unit associated with the video data, wherein the SEI NAL unit comprises a RBSP that comprises one or more SEI message structures, and wherein the one or more SEI message structures comprise at least one nesting SEI message structure having one or more SEI messages; and code a syntax element indicative of a number of SEI messages comprised within the at least one nesting SEI message structure.

In another embodiment, a device for video coding is disclosed. The device comprises means for processing a SEI NAL unit associated with the video data, wherein the SEI NAL unit comprises a RBSP that comprises one or more SEI message structures, and wherein the one or more SEI message structures comprise at least one nesting SEI message structure having one or more SEI messages; and means for coding a syntax element indicative of a number of SEI messages comprised within the at least one nesting SEI message structure.

In another embodiment, a non-transitory computer-readable medium is disclosed. The non-transitory computer-readable medium has instructions stored thereon that, when executed, cause one or more processors to: process a SEI NAL unit, comprising a RBSP that comprises one or more SEI message structures, wherein the one or more SEI message structures comprise at least one nesting SEI message structure having one or more SEI messages; and code a syntax element indicative of a number of SEI messages comprised within the at least one nesting SEI message structure.

In each of these embodiments, the at least one nesting SEI message structure may comprise one of a scalable nesting SEI message structure or a bitstream partition nesting SEI message structure.

Additionally or alternatively, in each of these embodiments, coding the syntax element may comprise decoding the syntax element, and the number of SEI messages comprised within the at least one nesting SEI message structure may be determined based on the decoded syntax element (e.g., by method, processor, means, and/or instructions).

Additionally or alternatively, in each of these embodiments, the at least one nesting SEI message structure may be parsed based on the determined number of SEI messages comprised within the at least one nesting SEI message structure (e.g., by method, processor, means, and/or instructions).

Additionally or alternatively, in each of these embodiments, the syntax element may be decoded from the at least one nesting SEI message structure.

Additionally or alternatively, in each of these embodiments, coding the syntax element may comprise encoding the syntax element, and the number of SEI messages comprised within the at least one nesting SEI message structure may be determined prior to encoding the syntax element (e.g., by method, processor, means, and/or instructions).

Additionally or alternatively, in each of these embodiments, the syntax element is encoded into the at least one nesting SEI message structure.

The details of one or more examples are set forth in the accompanying drawings and the description below, which are not intended to limit the full scope of the inventive concepts described herein. Other features, objects, and advantages will be apparent from the description and drawings, and from the claims.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
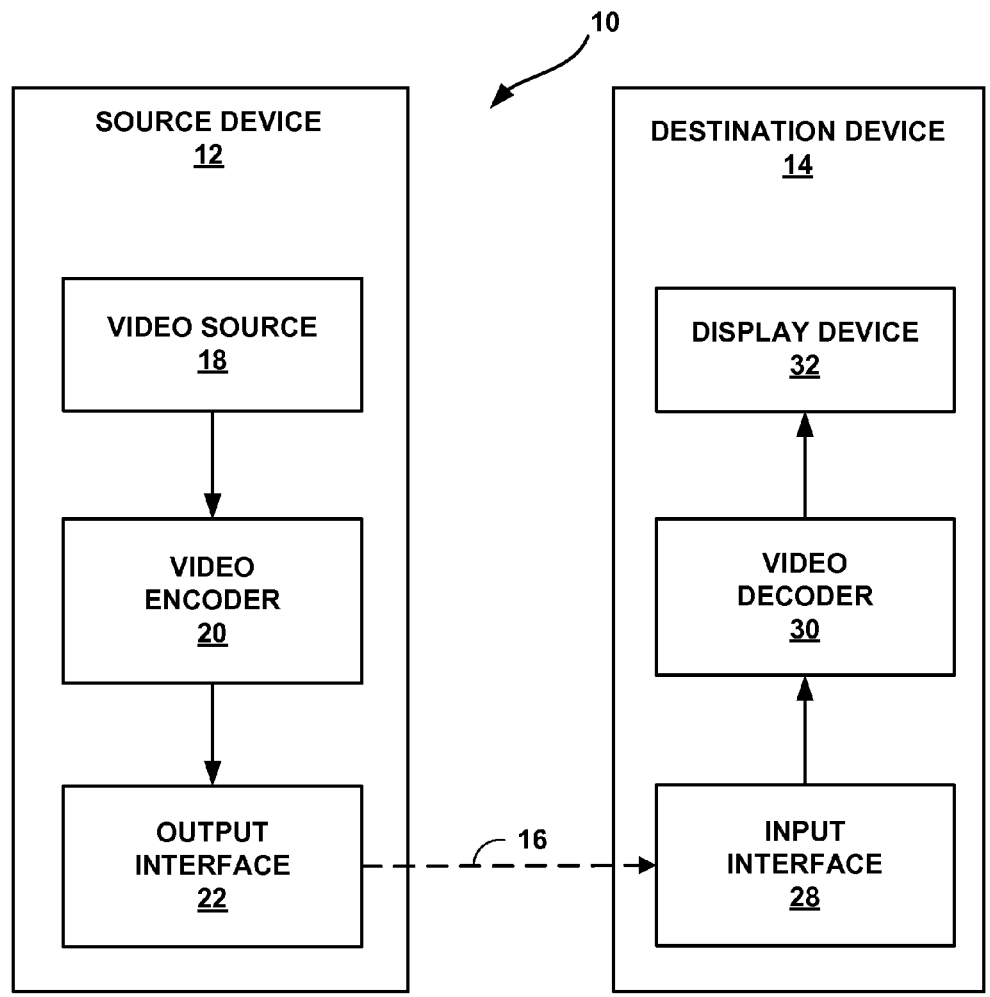
FIG. 1 is a block diagram illustrating an example video encoding and decoding system that may utilize techniques in accordance with aspects described in this disclosure.

In general, this disclosure relates to nesting supplemental enhancement information (SEI) messages for multi-layer (or multi-view) coding in the context of advanced video codecs, such as High Efficiency Video Coding (HEVC). More specifically, the techniques described in this disclosure relate to systems, apparatuses, and methods for reducing or eliminating parsing errors during the parsing of nesting SEI message structures in the multi-view and scalable extensions of HEVC, namely MV-HEVC and SHVC, respectively.

An SEI NAL unit may comprise a raw byte sequence payload (RBSP) structure, which may, in turn, comprise one or more SEI message structures. There are different types of SEI message structures which may be comprised in the RBSP structure. These types include nesting SEI message structures, which may contain one or multiple SEI messages. For example, the scalable nesting SEI message structure and the bitstream partition nesting SEI message structure are two such types of nesting SEI message structures.

Based on conventional syntax structures for scalable nesting SEI message structures and bitstream partition nesting SEI message structures, decoders parse SEI messages within the nesting SEI message structure until a byte position is equal to the position of the first bit, in the trailing bits of the RBSP structure, that has a value of 1. Thus, if a nesting SEI message structure precedes other data (i.e., data other than the RBSP trailing bits) within the RBSP structure, a decoder implementing these conventional syntax structures will attempt to parse the other data as an SEI message within the nesting SEI message structure, resulting in a parsing error.

Embodiments disclosed herein prevent these parsing errors, related to nesting SEI message structures, by modifying the conventional syntax structures for nesting SEI messages (e.g., scalable nesting SEI message structures and/or bitstream partition nesting SEI message structures), such that decoders may parse SEI messages based on the number of SEI messages within the nesting SEI message structure, rather than the RBSP trailing bits. For example, an indication of the number of SEI messages within the nesting SEI message structure may be encoded as a syntax element within the nesting SEI message structure. This syntax element may then be used during decoding to ensure that only that number of SEI messages is parsed.

While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its scalable and multi-view extensions. Also, the techniques described in this disclosure may become part of standards developed in the future. In other words, the techniques described in this disclosure may be applicable to previously developed video coding standards, video coding standards currently under development, and forthcoming video coding standards.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including two layers (e.g., a lower layer such as the base layer, and a higher layer such as the enhancement layer) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its scalable and multi-view coding extensions named SVC and MVC, respectively.

In addition, HEVC is being developed by the Joint Collaboration Team on Video Coding (JCT-VC) of ITU-T Video Coding Experts Group (VCEG) and ISO/IEC Motion Picture Experts Group (MPEG). The multi-view extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Video Coding System

Various aspects of the novel systems, apparatuses, and methods are described more fully hereinafter with reference to the accompanying drawings. However, this disclosure may be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram that illustrates an example video coding system 10 that may utilize the techniques for eliminating or reducing parsing errors in the parsing of SEI messages described elsewhere herein (e.g., by coding a syntax element indicative of a number of SEI messages, comprised within a nesting SEI message structure, into the nesting SEI message structure, and/or using the syntax element to parse the SEI messages). As used described herein, the term "video coder" refers generically to both video encoders and video decoders. In this disclosure, the terms "video coding" or "coding" may refer generically to video encoding and video decoding.

As shown in FIG. 1, video coding system 10 includes source device 12 and destination device 14. Source device 12 generates encoded video data. Destination device 14 may decode the encoded video data generated by source device 12. Source device 12 can provide the video data to the destination device 14 via communication channel 16, which may include a computer-readable storage medium or other communication channel. In the example of FIG. 1, source device 12 and destination device 14 constitute separate devices. It is noted, however, that source device 12 and destination device 14 may be part of a same device (not shown).

Source device 12 and destination device 14 may respectively include a wide range of devices, including desktop computers, notebook (e.g., laptop) computers, tablet computers, set-top boxes, telephone handsets, wireless communication devices such as so-called "smart" phones and/or so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computing device, devices or apparatus that can be consumed, ingested, or placed within an entity, and/or the like. Source device 12 and destination device 14 may be equipped for wireless communication (e.g., cellular communication, local and/or wide area communication, peer-to-peer communication, near field communication, and/or the like).

Destination device 14 may receive, via communication channel 16, the encoded video data to be decoded. Communication channel 16 may comprise a type of medium or device capable of moving (i.e., communicating or transmitting) the encoded video data from source device 12 to destination device 14. For example, communication channel 16 may comprise a communication medium to enable source device 12 to transmit encoded video data directly to destination device 14 in real time. The encoded video data may be modulated according to a communication standard, such as a wireless communication protocol, and transmitted to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network, such as the Internet. The communication medium may include routers, switches, base stations, or other equipment that may be useful to facilitate communication from source device 12 to destination device 14.

In some embodiments of the present disclosure, encoded data may be output from output interface 22 to a storage device. In such examples, channel 16 may correspond to a storage device or computer-readable storage medium that stores the encoded video data generated by source device 12. For example, destination device 14 may access the computer-readable storage medium via disk access or card access. Similarly, encoded data may be accessed from the computer-readable storage medium by input interface 28. The computer-readable storage medium may include any of a variety of distributed or locally accessed data storage media such as a hard drive, Blu-ray discs, DVDs, CD-ROMs, flash memory, volatile or non-volatile memory, or other digital storage media for storing video data. The computer-readable storage medium may correspond to a file server or another intermediate storage device that may store the encoded video generated by source device 12. Destination device 14 may access stored video data from the computer-readable storage medium via streaming or download. The file server may be a type of server capable of storing encoded video data and transmitting that encoded video data to destination device 14. Example file servers include a web server (e.g., for a website), a file transfer protocol (FTP) server, network attached storage (NAS) devices, or a local disk drive. Destination device 14 may access the encoded video data through a standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the computer-readable storage medium may be a streaming transmission, a download transmission, or a combination of both.

The techniques of this disclosure can apply applications or settings in addition to wireless applications or settings. The techniques may be applied to video coding in support of a of a variety of multimedia applications, such as over-the-air television broadcasts, cable television transmissions, satellite television transmissions, Internet streaming video transmissions, such as dynamic adaptive streaming over Hypertext Transfer Protocol (HTTP), digital video that is encoded onto a data storage medium, decoding of digital video stored on a data storage medium, or other applications. In some embodiments, system 10 may be configured to support one-way or two-way video transmission to support applications such as video streaming, video playback, video broadcasting, and/or video telephony.

In FIG. 1, source device 12 includes video source 18, video encoder 20, and output interface 22. Destination device 14 includes input interface 28, video decoder 30, and display device 32. Video encoder 20 of source device 12 may be configured to apply the techniques for coding a bitstream including video data conforming to multiple standards (e.g., HEVC) or standard extensions. In other embodiments of the present disclosure, source device 12 and destination device 14 may include other components or arrangements. For example, source device 12 may receive video data from a video source that is "external" (i.e., a source other than the video source 18) to video source 18 such as an external camera. Likewise, destination device 14 may interface with an external display device, rather than including an integrated display device such as display device 32.

Video source 18 of source device 12 may include a video capture device, such as a video camera, a video archive containing previously-captured video, and/or a video feed interface to receive video from a video-content provider. Video source 18 may generate computer graphics-based data as the source video, or a combination of live video, archived video, and/or computer-generated video. In some embodiments, based on video source 18 being a video camera, source device 12 and destination device 14 may form so-called "camera phones" or "video phones". The captured, pre-captured, and/or computer-generated video may be encoded by video encoder 20. The encoded video information may be output by output interface 22 to a communication channel 16, which may include a computer-readable storage medium, as discussed above.

Computer-readable storage medium may include transient media, such as a wireless broadcast or wired network transmission, or storage media (e.g., non-transitory storage media), such as a hard disk, a flash drive, a compact disc, a digital video disc, a Blu-ray disc, or other computer-readable media. A network server (not shown) may receive encoded video data from source device 12 and provide the encoded video data to destination device 14 (e.g., via network transmission). A computing device of a medium production facility, such as a disc stamping facility, may receive encoded video data from source device 12 and produce a disc containing the encoded video data. Therefore, communication channel 16 may be understood to include one or more computer-readable storage media of various forms.

Input interface 28 of destination device 14 can receive information via (e.g., from or over) communication channel 16. The information received via communication channel 16 may include syntax information defined by video encoder 20, which can be used by video decoder 30, that includes syntax elements that describe characteristics and/or processing of blocks and/or other coded units (e.g., a group of pictures (GOP)). Display device 32 displays the decoded video data, for example, to a user, and may include any of a variety of display devices such as a cathode ray tube (CRT), a liquid crystal display (LCD), a plasma display, an organic light emitting diode (OLED) display, or another type of display device.

Video encoder 20 and/or video decoder 30 may operate according to a video coding standard, such as the HEVC standard, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263.

Although not shown in FIG. 1, in some aspects, video encoder 20 and video decoder 30 may each be integrated with an audio encoder and audio decoder, and may include appropriate MUX-DEMUX units, or other hardware and/or software, to handle encoding of both audio and video in a common data stream or in separate data streams. If applicable, MUX-DEMUX units may conform to the ITU H.223 multiplexer protocol, or other protocols such as the user datagram protocol (UDP).

FIG. 1 is merely an example, and the techniques for eliminating or reducing parsing errors in the parsing of SEI messages described elsewhere herein (e.g., by utilizing a syntax element indicative of a number of SEI messages, coded into a nesting SEI message structure) may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC continues to work on development of the HEVC standard. The HEVC standardization efforts are based on an evolving model of a video coding device referred to as the HEVC Test Model (HM). The HM presumes several additional capabilities of video coding devices relative to existing devices according to, for example, ITU-T H.264/AVC. For instance, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete sine transform (DST), a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video Encoder

Figure 2A:
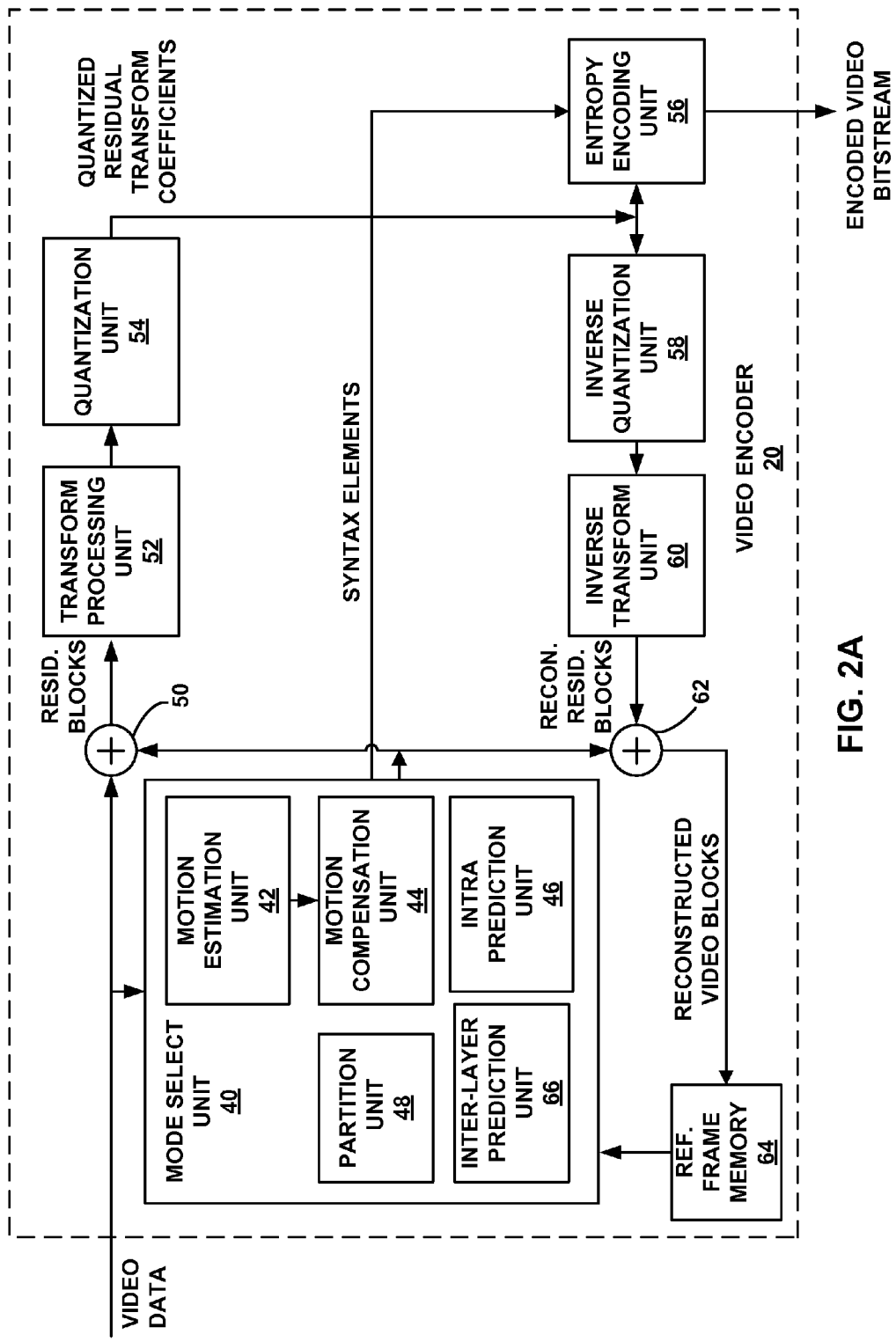
FIG. 2A is a block diagram illustrating an example of a video encoder that may implement techniques in accordance with aspects described in this disclosure.

FIG. 2A is a block diagram illustrating an example of video encoder 20 that may implement techniques in accordance with aspects described in this disclosure. Video encoder 20 may be configured to process a single layer of a video bitstream, such as for HEVC. Further, video encoder 20 may be configured to perform any or all of the techniques of this disclosure, including but not limited to the methods of preventing or reducing parsing errors in SEI messages and related processes described in greater detail elsewhere herein. As one example, inter-layer prediction unit 66 (when provided) may be configured to perform any or all of the techniques described in this disclosure. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. Video encoder 20 of FIG. 2A illustrates a single layer of a codec. However, as will be described further with respect to FIG. 2B, some or all of video encoder 20 may be duplicated for processing according to a multi-layer codec.

Video encoder 20 may perform intra-, inter-, and inter-layer prediction (sometime referred to as intra-, inter- or inter-layer coding) of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Inter-layer coding relies on prediction based upon video within a different layer(s) within the same video coding sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2A, video encoder 20 receives a current video block within a video frame to be encoded. In the example of FIG. 2A, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, inter-layer prediction unit 66, and partition unit 48. Reference frame memory 64 may include a decoded picture buffer. The decoded picture buffer is a broad term having its ordinary meaning, and in some embodiments refers to a video codec-managed data structure of reference frames.

For video block reconstruction, video encoder 20 also includes inverse quantization unit 58, inverse transform unit 60, and summer 62. A deblocking filter (not shown in FIG. 2A) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization, etc.). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra, inter, or inter-layer prediction mode, e.g., based on error results, and provide the resulting intra-, inter-, or inter-layer coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In some embodiments, motion estimation unit 42 can perform motion estimation relative to luma components, and motion compensation unit 44 can use motion vectors calculated based on the luma components for both chroma components and luma components. Mode select unit 40 may generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes (e.g., during separate encoding passes), and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as code-word mapping tables), definitions of encoding contexts for various blocks, and indications of a most probable intra-prediction mode, an intra-prediction mode index table, and a modified intra-prediction mode index table to use for each of the contexts.

Video encoder 20 may include an inter-layer prediction unit 66. Inter-layer prediction unit 66 is configured to predict a current block (e.g., a current block in the enhancement layer) using one or more different layers that are available in SVC (e.g., a base or reference layer). Such prediction may be referred to as inter-layer prediction. Inter-layer prediction unit 66 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. When the base and enhancement layers have different spatial resolutions, spatial motion vector scaling and/or inter-layer position mapping using a temporal scaling function may be performed by inter-layer prediction unit 66, as described in greater detail below.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. For example, discrete sine transforms (DST), wavelet transforms, integer transforms, sub-band transforms or other types of transforms can also be used.

Transform processing unit 52 can apply the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain (e.g., for later use as a reference block). Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion-compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Multi-Layer Video Encoder

Figure 2B:
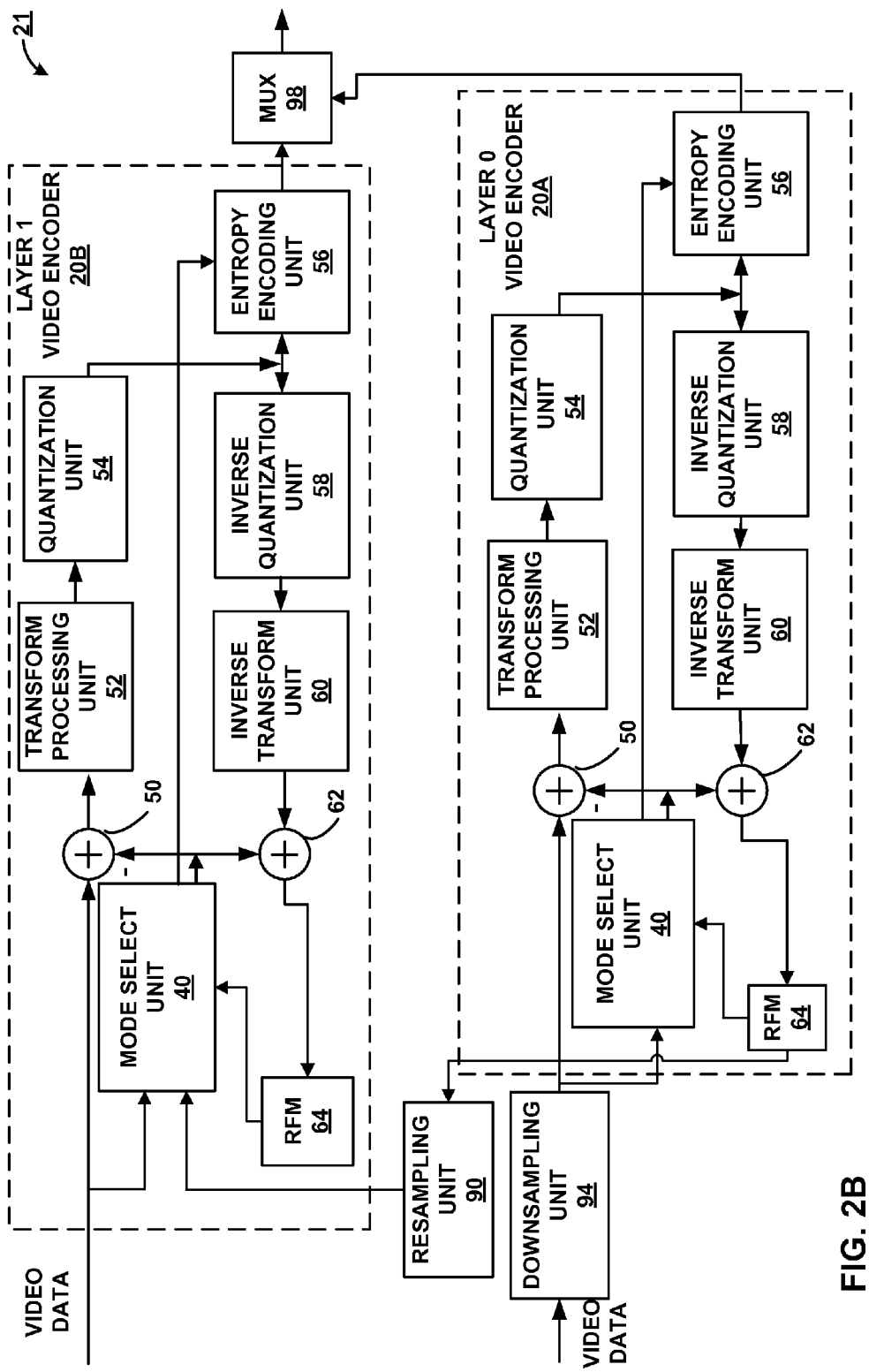
FIG. 2B is a block diagram illustrating an example of a video encoder that may implement techniques in accordance with aspects described in this disclosure.

FIG. 2B is a block diagram illustrating an example of a multi-layer video encoder 21 (also referred to simply as video encoder 21) that may implement techniques in accordance with aspects described in this disclosure. Video encoder 21 may be configured to process multi-layer video frames, such as for SHVC, 3D-HEVC, and/or MV-HEVC. Further, the video encoder 21 may be configured to perform any or all of the techniques of this disclosure, including but not limited to the methods for eliminating or reducing parsing errors in the parsing of SEI messages described elsewhere herein (e.g., by coding a syntax element indicative of a number of SEI messages into a nesting SEI message structure).

Video encoder 21 includes a video encoder 20A and a video encoder 20B, each of which may be configured as video encoder 20 of FIG. 2A and may perform the functions described above with respect to video encoder 20. Further, as indicated by the reuse of reference numbers, video encoders 20A and 20B may include at least some of the same or similar systems and subsystems included in video encoder 20. Although video encoder 21 is illustrated as including two video encoders 20A and 20B, video encoder 21 is not limited as such and may include any number of video encoder layers. In some embodiments, video encoder 21 may include a video encoder 20 for each picture or frame in an access unit. For example, an access unit that includes five pictures may be processed or encoded by a video encoder that includes five encoder layers. In some embodiments, video encoder 21 may include more encoder layers than frames in an access unit. In some such cases, some of the video encoder layers may be inactive when processing some access units.

In addition to video encoders 20A and 20B, video encoder 21 may include a resampling unit 90. Resampling unit 90 may, in some cases, up-sample a base layer of a received video frame to, for example, create an enhancement layer. Resampling unit 90 may up-sample particular information associated with the received base layer of a frame, but not other information. For example, resampling unit 90 may up-sample the spatial size or number of pixels of the base layer, but the number of slices or the picture order count may remain constant. In some cases, resampling unit 90 may not process the received video and/or may be optional. For example, in some cases, mode select unit 40 may perform up-sampling. In some embodiments, resampling unit 90 is configured to up-sample a layer and reorganize, redefine, modify, or adjust one or more slices to comply with a set of slice boundary rules and/or raster scan rules. Although primarily described as up-sampling a base layer, or a lower layer in an access unit, in some cases, resampling unit 90 may down-sample a layer. For example, if bandwidth is reduced during streaming of a video, a frame may be down-sampled instead of up-sampled. Resampling unit 90 may be further configured to perform cropping and/or padding operations, as well.

Resampling unit 90 may be configured to receive a picture or frame (or picture information associated with the picture) from decoded picture buffer 114 of the lower layer encoder (e.g., video encoder 20A) and to up-sample the picture (or the received picture information). This up-sampled picture may then be provided to mode select unit 40 of a higher layer encoder (e.g., video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, resampling unit 90 may be omitted or bypassed. In such cases, the picture from decoded picture buffer 64 of video encoder 20A may be provided directly, or at least without being provided to resampling unit 90, to mode select unit 40 of video encoder 20B. For example, if video data provided to video encoder 20B and the reference picture from decoded picture buffer 64 of video encoder 20A are of the same size or resolution, the reference picture may be provided to video encoder 20B without any resampling.

In some embodiments, video encoder 21 down-samples video data to be provided to the lower layer encoder using down-sampling unit 94 before providing the video data to video encoder 20A. Alternatively, down-sampling unit 94 may be a resampling unit 90 capable of up-sampling or down-sampling the video data. In yet other embodiments, down-sampling unit 94 may be omitted.

As illustrated in FIG. 2B, video encoder 21 may further include multiplexor 98, or mux. Mux 98 can output a combined bitstream from video encoder 21. The combined bitstream may be created by taking a bitstream from each of video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of video encoders 20A and 20B. For instance, two blocks may be output from video encoder 20B for each block output from video encoder 20A. In some embodiments, the output stream from mux 98 may be preprogrammed. In other embodiments, mux 98 may combine the bitstreams from video encoders 20A and 20B based on a control signal received from a system external to video encoder 21, such as from a processor on source device 12. The control signal may be generated based on the resolution or bitrate of a video from video source 18, based on a bandwidth of channel 16, based on a subscription associated with a user (e.g., a paid subscription versus a free subscription), or based on any other factor for determining a resolution output desired from video encoder 21.

Video Decoder

Figure 3A:
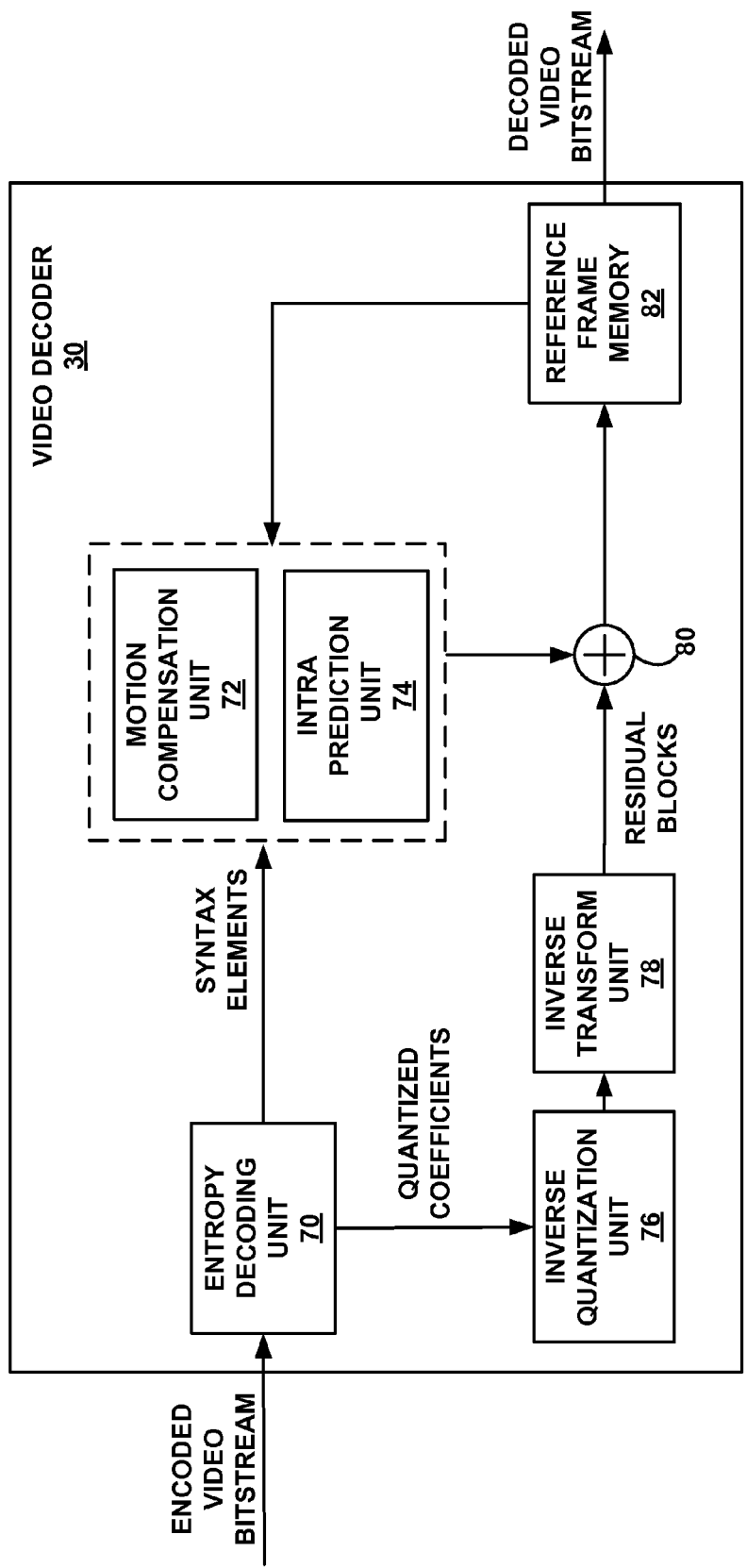
FIG. 3A is a block diagram illustrating an example of a video decoder that may implement techniques in accordance with aspects described in this disclosure.

FIG. 3A is a block diagram illustrating an example of video decoder 30 that may implement techniques in accordance with aspects described in this disclosure. Video decoder 30 may be configured to process a single layer of a video bitstream, such as for HEVC. Further, video decoder 30 may be configured to perform any or all of the techniques of this disclosure, including but not limited to the methods of eliminating or reducing parsing errors in the parsing of SEI messages described elsewhere herein. As one example, inter-layer prediction unit 75 may be configured to perform any or all of the techniques described in this disclosure, including but not limited to the methods for eliminating or reducing parsing errors in the parsing of SEI messages described elsewhere herein (e.g., by utilizing a syntax element, indicative of a number of SEI messages, within a nesting SEI message). However, aspects of this disclosure are not so limited. In some examples, these techniques may be shared among the various components of video decoder 30. In some examples, additionally or alternatively, a processor (not shown) may be configured to perform any or all of these.

For purposes of explanation, this disclosure describes video decoder 30 in the context of HEVC coding. However, the techniques of this disclosure, including but not limited to the methods for eliminating or reducing parsing errors in the parsing of SEI messages described elsewhere herein, may be applicable to other coding standards or methods. Video decoder 30 of FIG. 3A illustrates a single layer of a codec. However, as will be described further with respect to FIG. 3B, some or all of video decoder 30 may be duplicated for processing according to a multi-layer codec.

In the example of FIG. 3A, video decoder 30 includes an entropy decoding unit 70, motion compensation unit 72, intra prediction unit 74, inter-layer prediction unit 75, inverse quantization unit 76, inverse transformation unit 78, reference frame memory 82, and summer 80. In some embodiments, motion compensation unit 72 and/or intra prediction unit 74 may be configured to perform inter-layer prediction, in which case the inter-layer prediction unit 75 may be omitted. Video decoder 30 may, in some examples, perform a decoding pass generally reciprocal to the encoding pass described with respect to video encoder 20 in FIG. 2A. Motion compensation unit 72 may generate prediction data based on motion vectors received from entropy decoding unit 70, while intra-prediction unit 74 may generate prediction data based on intra-prediction mode indicators received from entropy decoding unit 70. Reference frame memory 82 may include a decoded picture buffer. The decoded picture buffer is a broad term having its ordinary meaning, and in some embodiments refers to a video codec-managed data structure of reference frames.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Video decoder 30 may also include an inter-layer prediction unit 75. Inter-layer prediction unit 75 is configured to predict a current block (e.g., a current block in the enhancement layer) using one or more different layers that are available in SVC (e.g., a base or reference layer). Such prediction may be referred to as inter-layer prediction. Inter-layer prediction unit 75 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. When the base and enhancement layers have different spatial resolutions, spatial motion vector scaling and/or inter-layer position mapping may be performed by inter-layer prediction unit 75 using a temporal scaling function, as described in greater detail below.

Inverse quantization unit 76 inverse quantizes (e.g., de-quantizes) the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform (e.g., an inverse DCT, an inverse DST, an inverse integer transform, or a conceptually similar inverse transform process) to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference frame memory 82, which stores reference pictures used for subsequent motion compensation. Reference frame memory 82 also stores decoded video for later presentation on a display device, such as display device 32 of FIG. 1.

Multi-Layer Video Decoder

Figure 3B:
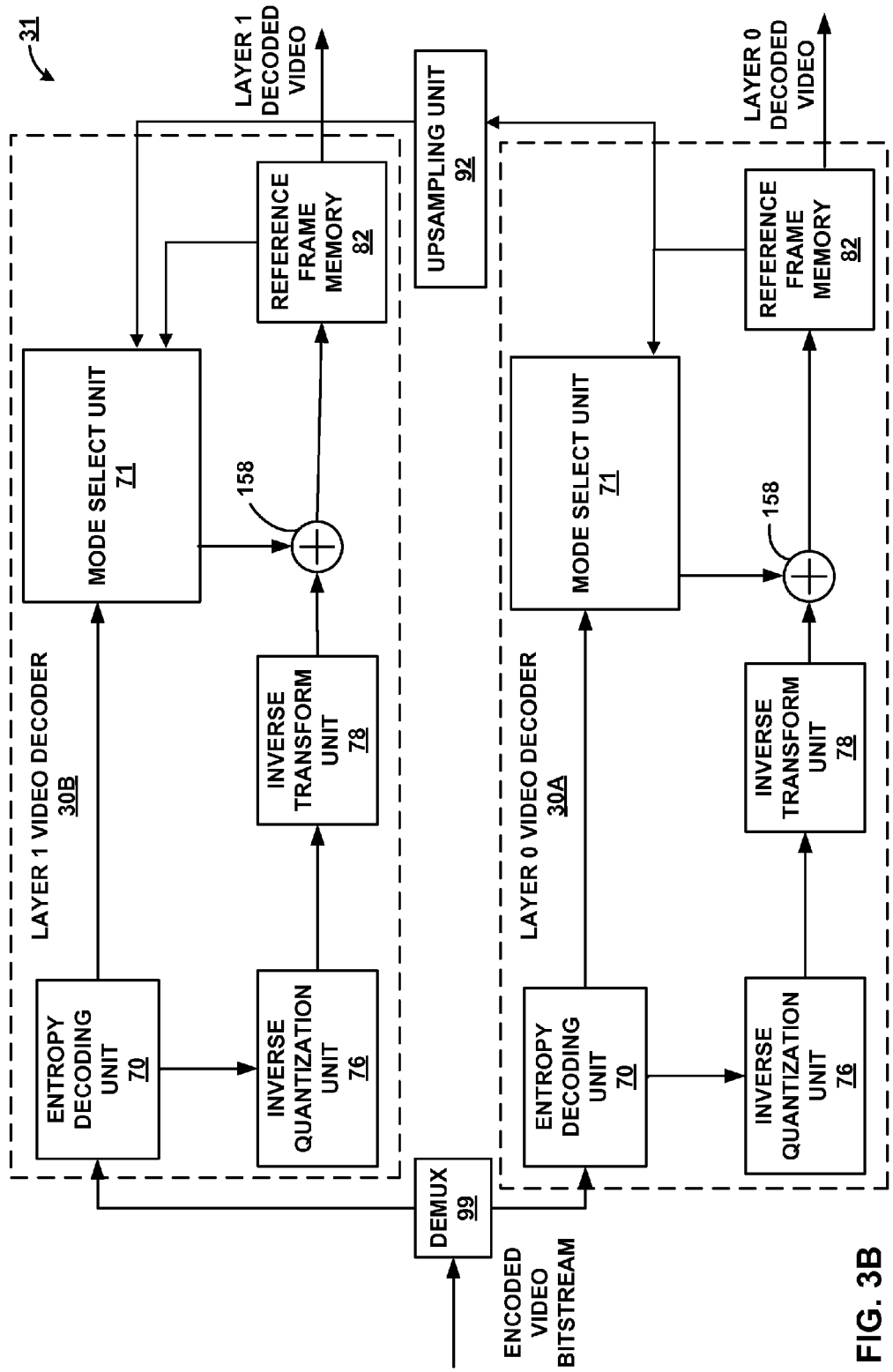
FIG. 3B is a block diagram illustrating an example of a video decoder that may implement techniques in accordance with aspects described in this disclosure.

FIG. 3B is a block diagram illustrating an example of a multi-layer video decoder 31 (also referred to simply as video decoder 31) that may implement techniques in accordance with aspects described in this disclosure. Video decoder 31 may be configured to process multi-layer video frames, such as for SHVC, 3D-HEVC, and/or MV-HEVC. Further, video decoder 31 may be configured to perform any or all of the techniques of this disclosure.

Video decoder 31 includes a video decoder 30A and a video decoder 30B, each of which may be configured as video decoder 30 of FIG. 3A and may perform the functions described above with respect to video decoder 30. Further, as indicated by the reuse of reference numbers, video decoders 30A and 30B may include at least some of the same or similar systems and subsystems as included in video decoder 30. Although video decoder 31 is illustrated as including two video decoders 30A and 30B, video decoder 31 is not limited as such and may include any number of video decoder layers. In some embodiments, video decoder 31 may include a video decoder 30 for each picture or frame in an access unit. For example, an access unit that includes five pictures may be processed or decoded by a video decoder that includes five decoder layers. In some embodiments, video decoder 31 may include more decoder layers than frames in an access unit. In some such cases, some of the video decoder layers may be inactive when processing some access units.

In addition to video decoders 30A and 30B, video decoder 31 may include an up-sampling unit 92. In some embodiments, up-sampling unit 92 may up-sample a base layer of a received video frame to create an enhanced layer to be added to the reference picture list for the frame or access unit. This enhanced layer can be stored in reference frame memory 82 (e.g., in its decoded picture buffer, etc.). In some embodiments, up-sampling unit 92 can include some or all of the embodiments described with respect to resampling unit 90 of FIG. 2B. In some embodiments, up-sampling unit 92 is configured to up-sample a layer and reorganize, redefine, modify, or adjust one or more slices to comply with a set of slice boundary rules and/or raster scan rules. In some cases, up-sampling unit 92 may be a resampling unit configured to up-sample and/or down-sample a layer of a received video frame.

Up-sampling unit 92 may be configured to receive a picture or frame (or picture information associated with the picture) from decoded picture buffer 82 of the lower layer decoder (e.g., video decoder 30A) and to up-sample the picture (or the received picture information). This up-sampled picture may then be provided to mode select unit 71 of a higher layer decoder (e.g., video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, up-sampling unit 92 may be omitted or bypassed. In such cases, the picture from decoded picture buffer 82 of video decoder 30A may be provided directly, or at least without being provided to up-sampling unit 92, to mode select unit 71 of video decoder 30B. For example, if video data provided to video decoder 30B and the reference picture from decoded picture buffer 82 of video decoder 30A are of the same size or resolution, the reference picture may be provided to video decoder 30B without up-sampling. Further, in some embodiments, up-sampling unit 92 may be a resampling unit 90 configured to up-sample or down-sample a reference picture received from decoded picture buffer 82 of video decoder 30A.

As illustrated in FIG. 3B, video decoder 31 may further include a demultiplexor 99, or demux. Demux 99 can split an encoded video bitstream into multiple bitstreams with each bitstream output by demux 99 being provided to a different video decoder 30A and 30B. The multiple bitstreams may be created by receiving a bitstream and each of video decoders 30A and 30B receives a portion of the bitstream at a given time. While in some cases the bits from the bitstream received at demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of video decoders 30A and 30B. For instance, two blocks may be provided to video decoder 30B for each block provided to video decoder 30A. In some embodiments, the division of the bitstream by demux 99 may be preprogrammed. In other embodiments, demux 99 may divide the bitstream based on a control signal received from a system external to video decoder 31, such as from a processor on destination device 14. The control signal may be generated based on the resolution or bitrate of a video from input interface 28, based on a bandwidth of channel 16, based on a subscription associated with a user (e.g., a paid subscription versus a free subscription), or based on any other factor for determining a resolution obtainable by video decoder 31.

Supplemental Enhancement Information (SEI) Messages

According to the HEVC standard, coded video data is organized into a sequence of data units referred to as Network Abstraction Layer (NAL) units, which are formed into access units. An access unit comprises a set of one or more NAL units that collectively represent pictures that correspond to the same output time. The one or more NAL units in an access unit comprise a set of one or more video coding layer (VCL) NAL units that collectively compose the pictures that correspond to the same output time, and zero or more non-VCL NAL units (i.e., NAL units that are not VCL NAL units). VCL NAL units carry slice segments of coded video data. Non-VCL NAL units typically contain control information. One type of non-VCL NAL unit that may be present in an access unit is a Supplemental Enhancement Information (SEI) NAL unit, which contains supplemental data (e.g., timing information) that may enhance usability of, but is not generally necessary for, a decoded video signal. SEI NAL units contain SEI messages having the SEI message structure described below. SEI messages may contain various types of metadata associated with the coded video data that may provide information associated with, for example, picture output timing, displaying, interpretation of color space, and/or framing packing.

Figure 4:
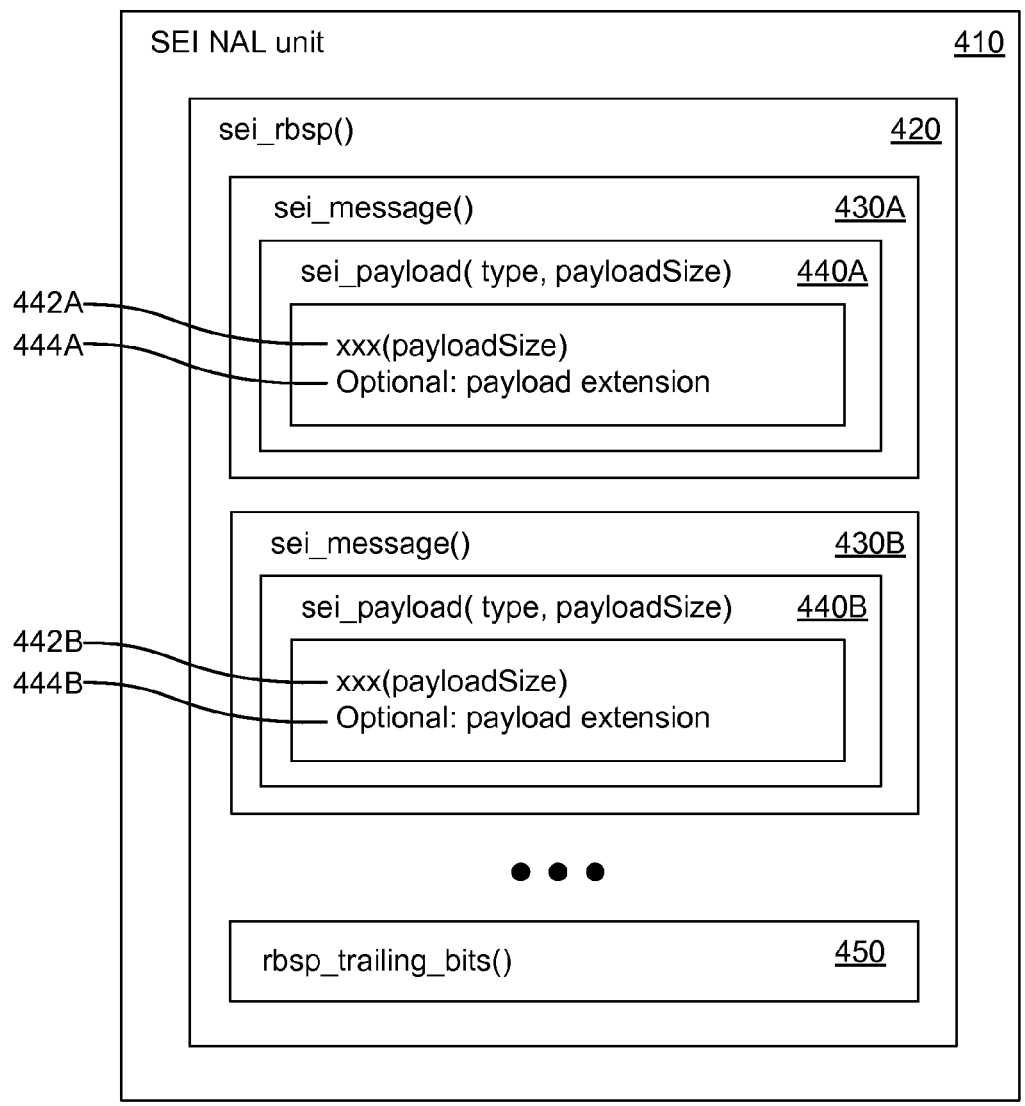
FIG. 4 illustrates the structure of a supplemental enhancement information (SEI) Network Abstraction Layer (NAL) unit in accordance with aspects described in this disclosure.

An SEI NAL unit may comprise one or more SEI message structures. An overall structure of an SEI NAL unit is illustrated in FIG. 4, according to an example. Portions of the structure that are not helpful to an understanding of the disclosed techniques have been omitted. Such omissions are identified in FIG. 4 by an ellipsis.

SEI NAL unit 410 comprises anRBSP, e.g., sei_rbsp( ) structure 420 (sei_rbsp( ) structure 420 is also referred to as SEI RBSP 420). In turn, sei_rbsp( ) structure 420 may comprise one or more sei_message( ) structures 430 (illustrated as two structures 430A and 430B). It should be understood that, while two sei_message( ) structures 430A and 430B are illustrated, sei_rbsp( ) 420 may comprise any number of sei_message( ) structures 430, including one sei_message( ) structure 430 or three or more sei_message( ) structures 430.

Each sei_message( ) structure 430 comprises an sei_payload structure 440 (illustrated as 440A and 440B for sei_message( ) structures 430A and 430B, respectively). The syntax structure of sei_message( ) structures 430 is contained in sei_payload structures 440 and is represented as xxx(payloadSize) structures 442 (illustrated as 442A and 442B for sei_payload structures 440A and 440B, respectively) in FIG. 4. Optionally, each sei_payload structure 440 may also comprise a payload extension 444 (illustrated as 444A and 444B for sei_payload structures 440A and 440B, respectively), which may be used for future extensibility of SEI_message( ) structures 430.

Some SEI message structures are nesting SEI message structures. Nesting SEI message structures may contain one or more SEI messages. For instance, sei_message( ) structure 430A may comprise multiple SEI messages nested within sei_message( ) structure 430A. Each SEI message contained in a nesting SEI message structure is applicable to a set of layers, operation points, output layer sets, and/or bitstream partitions, as specified by the nesting SEI message structure.

Conventional practice, for example the current draft of the HEVC specification, HEVC Version 1, specifies one type of nesting SEI message structure: scalable nesting SEI message structures. In addition, the current drafts of the multi-layer (or multi-view) extensions specify another type of nesting SEI message structure: bitstream partition nesting SEI message structures. The terms "nesting SEI message structure" and "nesting SEI structure," in singular or plural form, is used herein to refer, collectively, to the scalable nesting SEI message structure and the bitstream partition nesting SEI message structure.

The current (i.e., conventional) syntax structure for the scalable nesting SEI message structure is illustrated in the following table. Portions of the syntax structure that are not helpful to an understanding of the disclosed techniques have been omitted. Such omissions are identified below by an ellipsis.

TABLE 1

| Line # | Syntax | Descriptor |
|---|---|---|
| 01 | scalable_nesting( payloadSize ) { | |
| 02 |   bitstream_subset_flag | u(1) |
| 03 |   ... | |
| 04 |     nesting_layer_id[i] | u(6) |
| 05 |   } | |
| 06 | } | |
| 07 |   while( !byte_aligned( ) ) | |

TABLE 1-continued

| Line # | Syntax | Descriptor |
| --- | --- | --- |
| 08 | nesting_zero_bit /* equal to 0 */ | u(1) |
| 09 | do | |
| 10 | sei_mes sage( ) | |
| 11 | while( more_rbsp_data( ) ) | |
| 12 | } | |

The current syntax structure of the bitstream partition nesting SEI message structure is illustrated in the following table.

TABLE 2

| Line # | Syntax | Descriptor |
| --- | --- | --- |
| 01 | bsp_nesting( payloadSize ) { | |
| 02 | bsp_idx | ue(v) |
| 03 | while( !byte_aligned( ) ) | |
| 04 | bsp_nesting_zero_bit /* equal to 0 */ | u(1) |
| 05 | do | |
| 06 | sei_message( ) | |
| 07 | while( more_rbsp_data( ) ) | |
| 08 | } | |

As illustrated above, the syntax structures for both the scalable nesting SEI message structure and the bitstream partition nesting SEI message structure comprise the do-while syntax of "do sei_message( ) while (more_rbsp_data( ))".

While this do-while syntax enables one or more SEI messages to be nested in the nesting SEI message structure, the do-while syntax of these conventional syntax structures has significant drawbacks. Specifically, the function "more_rbsp_data( )", which is set as the condition of the do-while syntax, returns a value of "1" (i.e., TRUE) until the current byte position in the SEI RBSP, comprising the nesting SEI message structure, is equal to the position of the last (i.e., least significant, right most) bit having a value of 1 in that particular SEI RBSP (e.g., SEI RBSP 420 of FIG. 4). This last bit having a value of 1 in the SEI RBSP syntax corresponds to the first bit in rbsp_trailing_bits( ) syntax structure 450 having a value of 1. As shown in FIG. 4, rbsp_trailing_bits( ) syntax structure 450 is present at the end of SEI RBSP 420. Consequently, if an SEI NAL unit comprises a nesting SEI message structure, and the nesting SEI message structure precedes other data (i.e., data other than the RBSP trailing bits) within the SEI NAL unit, the do-while syntax of the nesting SEI message structure will process that other data using the function sei_message( ) resulting in a parsing error of the SEI NAL unit.

For example, with reference to FIG. 4, if sei_payload structure 440A comprises a nesting SEI message structure as structure 442A, a decoder, based on the do-while syntax of the nested SEI message, will process sei_rbsp structure 420 until reaching the RBSP trailing bits (i.e., rbsp_trailing_bits( ) 450) at the end of sei_rbsp structure 420. Accordingly, the do-while syntax of structure 442A will process the payload extension of sei_payload structure 440A, if any, as well as sei_message structure 430B, according to the function "sei_message( )", resulting in a parsing error.

Thus, a bitstream cannot properly be parsed—and therefore, is a non-conforming bitstream—if the bitstream includes an SEI NAL unit that comprises a nesting SEI message structure (e.g., either a scalable nesting SEI message structure or a bitstream partition nesting SEI message structure) in accordance with current schemes and if any of the following is true:

(1) the SEI NAL unit comprises any SEI message that follows, in decoding order, the sei_payload structure containing the nesting SEI message structure; or (2) the sei_payload structure containing the nesting SEI message structure comprises payload extension data (e.g., any of the following syntax elements: reserved_payload_extension_data, payload_bit_equal_to_one, or payload_bit_equal_to_zero).

As a result of these drawbacks in the current syntax structure of nesting SEI message structures (e.g., scalable nesting SEI message structures and/or bitstream partition nesting SEI message structures), nesting SEI message structures cannot be extended using the extension mechanism provided in the sei_payload structure. Accordingly, methods which address these drawbacks in the current syntax structure of nesting SEI message structures will now be discussed. Various features of these respective exemplary embodiments may be applied independently or in combination with one another.

In various embodiments of the present disclosure, the number of sei_messages( ) contained in a nesting SEI message structure may be signaled by a video encoder (e.g., video encoder 20 of video encoder 21) and received by a video decoder (e.g., video decoder 30 or video decoder 31), and the syntax structure of the nesting SEI message structure may be parsed, for example by a video decoder, based on that number. For example, one or both of the syntax structures of the scalable nesting SEI message structure and the bitstream partition nesting SEI message structure may be modified by replacing the do-while syntax, which calls the function "sei_message( )" as long as the function "more_rbsp_data( )" returns a value of 1 as described above, with syntax that only calls (i.e., instructs execution of or performance of) the function "sei_message( )" the signaled number of times.

For instance in accordance with the present disclosure, the syntax structure of the scalable nesting SEI message structure may be modified as illustrated in the following table. Again, portions of the syntax structure that are not helpful to an understanding of the disclosed techniques have been omitted. Such omissions are identified below by an ellipsis.

TABLE 3

| Line # | Syntax | Descriptor |
| --- | --- | --- |
| 01 | scalable_nesting( payloadSize ) { | |
| 02 | bitstream_subset_flag | u(1) |
| 03 | . . . | |
| 04 | nesting_layer_id[i] | u(6) |
| 05 | } | |
| 06 | } | |
| 07 | while( !byte_aligned( ) ) | |
| 08 | nesting_zero_bit /* equal to 0 */ | u(1) |
| 09 | num_seis_in_scalable_minus 1 | u(1) |
| 10 | for( i = 0; i <= num_seis_in_scalable_minus1; i++ ) | |
| 11 | sei_message( ) | |
| 12 | } | |

Similarly, the syntax structure of the bitstream partition nesting SEI message structure may be modified as illustrated in the following table.

TABLE 4

| Line # | Syntax | Descriptor |
| --- | --- | --- |
| 01 | bsp_nesting( payloadSize ) { | |
| 02 |   bsp_idx | ue(v) |
| 03 |   while( !byte_aligned( ) ) | |
| 04 |     bsp_nesting_zero_bit /* equal to 0 */ | u(1) |
| 05 |   num_seis_in_bsp_minus 1 | ue(v) |
| 06 |   for( i = 0; i <= num_seis_in_bsp_minus1; i++ ) | |
| 07 |     sei_message( ) | |
| 08 | } | |

Specifically, lines 09-11 in the current syntax structure of the scalable nesting SEI message structure, illustrated in Table 1 above, have been replaced in Table 3 with a syntax structure that calls the function "sei_message( )" based on the number specified by the variable (i.e., the syntax element) "num_seis_in_scalable_minus1". Similarly, the lines 05-07 in the current syntax structure of the bitstream partition nesting SEI message structure, illustrated in Table 2, has been replaced in Table 4 with a syntax structure that calls the function "sei_message( )" based on the number stored in the variable "num_seis_in_bsp_minus1".

The number specified by the variable "num_seis_in_scalable_minus1" is one less than the number of sei_message structures contained in the scalable nesting SEI message structure. Similarly, the number specified by the variable "num_seis_in_bsp_minus1" is one less than the number of sei_message structures contained in the bitstream partition nesting SEI message structure. More specifically, "num_seis_in_bsp_minus1" plus 1 specifies the number of sei_message( ) structures contained in the bsp_nesting( ) syntax structure. In other words, one more than the number specified by each syntax element indicates the number of sei_message structures contained in the respective nesting SEI message structure's syntax structure. It should be understood that the variables "num_seis_in_scalable_minus1" and "num_seis_in_bsp_minus1" may be integers or other data types capable of representing a number.

In both Tables 3 and 4, the substituted structure comprises a "for" loop which iterates through the instruction "sei_message( )" a number of times that is equal to one more than the number specified by "num_seis_in_scalable_minus1" (i.e., "num_seis_in_scalable_minus1"+1) and that is equal to one more than the number in "num_seis_in_bsp_minus1" (i.e., "num_seis_in_bsp_minus1"), respectively. It should be understood that other types of structures that iterate through a set of one or more instructions a signaled number of times can be used in place of the illustrated "for" loop. It should also be understood that the "for" loop may be modified to use the number of sei_message structures in the respective nesting SEI message structure, instead of one less than the number of sei_message structures in the respective nesting SEI message structure, for example, by increasing the starting iteration by one (i.e., "i=1" instead of "i=0") or replacing the less-than-or-equal operator with a less-than operation (i.e., "i<num_seis_in_scalable" instead of "i<=num_seis_in_scalable_minus1", and "i<num_seis_in_bsp" instead of "i<=num_seis_in_bsp_minus1").

In various embodiments, the value of num_seis_in_scalable_minus1 and/or the value of num_seis_in_bsp_minus1 may be constrained to a range of zero to fifteen, inclusive. However, it should be understood that the value of num_seis_in_scalable_minus1 and/or the value of num_seis_in_bsp_minus1 may be constrained to a different range and/or different ranges from each other, or not be limited at all. When one or more of these values is constrained to a range of values, the constraint may be imposed at either an encoder or decoder, or at both an encoder and decoder. For instance, video encoder 20 may prevent more than a predetermined number of SEI messages from being added to a nesting SEI message structure of a SEI NAL unit.

With the modified nesting SEI message syntax structure, the nesting SEI message structures do not have the limitations of the current (i.e., conventional) nesting SEI message structures discussed above. Specifically, the nesting SEI message structures are no longer constrained to be the last SEI message structure in an SEI NAL unit, and may be extended (e.g., using the reserved_payload_extension_data syntax element).

Figure 5:
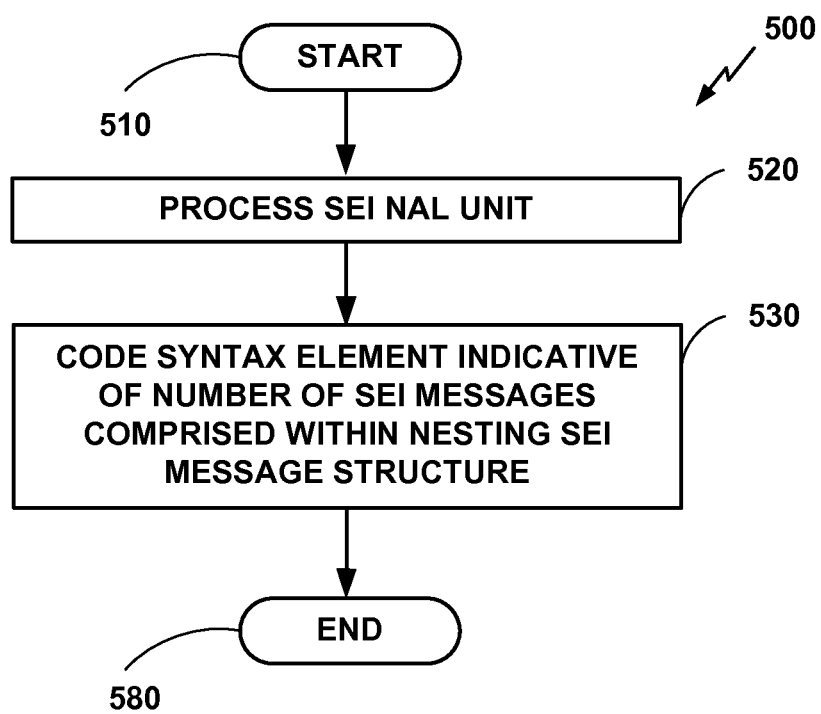
FIG. 5 is a block diagram illustrating an example of a portion of a video coding process in accordance with aspects described in this disclosure.

FIG. 5 illustrates an exemplary process 500 for video coding, according to various embodiments of the present disclosure. Process 500, which starts in step 510, may be implemented by video encoder 20, video encoder 21, video decoder 30, and/or video decoder 31, or any other component. In step 520, an SEI NAL unit is processed. The SEI NAL unit may comprise an RBSP that comprises one or more SEI message structures. One or more of these SEI message structures comprises at least one nesting SEI message structure configured to comprise one or more SEI messages. In step 530, a syntax element, indicative of a number of SEI messages comprised within the at least one nesting SEI message structure, is coded. This coding may comprise decoding the syntax element (e.g., as described with respect to step 650 in FIG. 6) or encoding the syntax element (e.g., as described with respect to step 770 in FIG. 7). In addition, step 530 may be performed as part of, or separate from, the processing in step 520. Process 500 ends in step 580.

Figure 6:
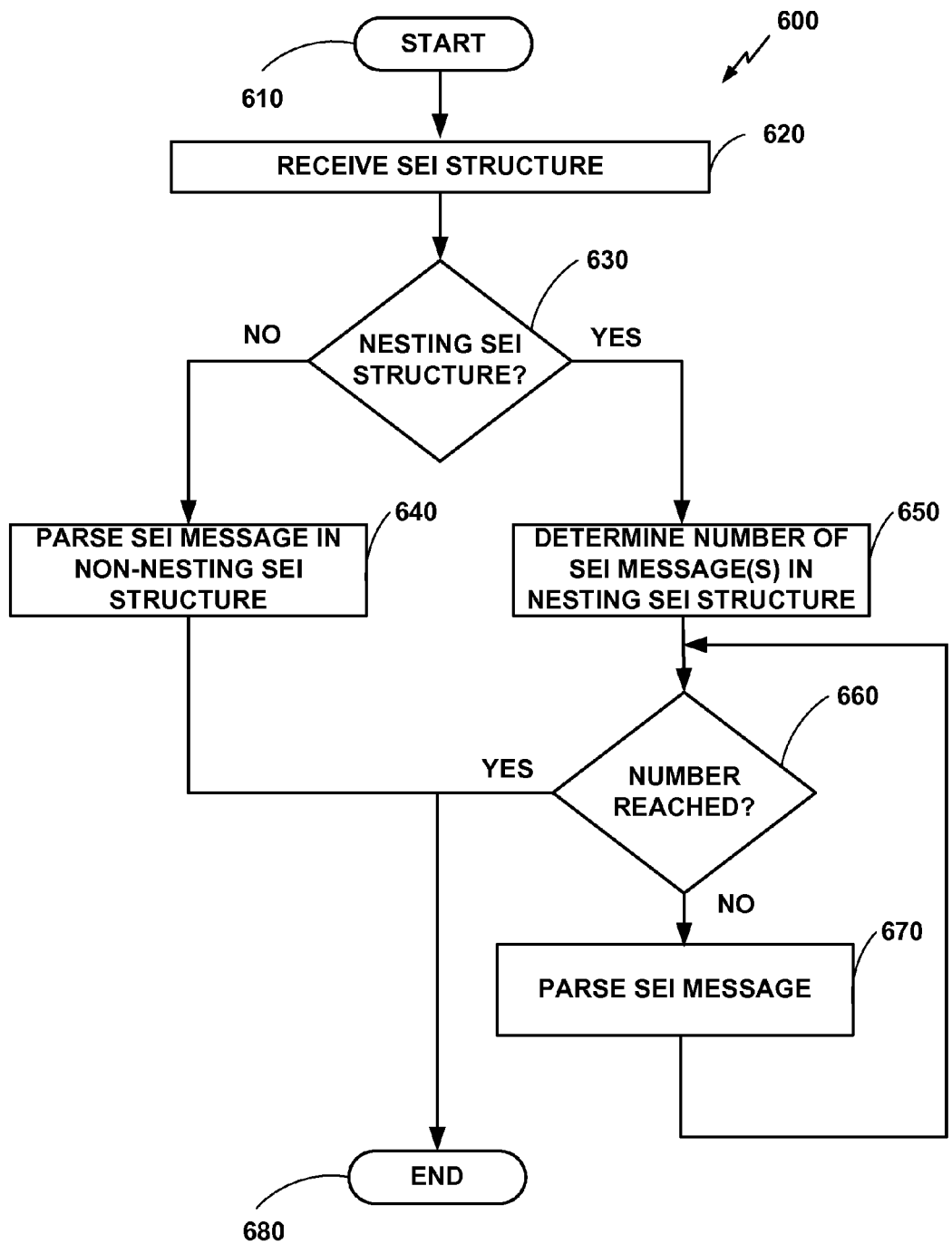
FIG. 6 is a block diagram illustrating an example of a portion of a video decoding process in accordance with aspects described in this disclosure.

FIG. 6 illustrates an exemplary process 600 to be used in video decoding, according to various embodiments of the present disclosure. Process 600, which starts in step 610, may be implemented by video decoder 30 and/or video decoder 31, or any other component. For convenience, process 600 is described as performed by video decoder 30. In step 620, an SEI message structure is received. In step 630, it is determined whether the SEI message structure is a nesting SEI message structure (e.g., a scalable nesting SEI message structure and/or a bitstream partition nesting SEI message structure) or a non-nesting SEI message structure. It should be understood that step 630 may be performed for only one particular type of nesting SEI message structure (e.g., either scalable nesting SEI message structures or bitstream partition nesting SEI message structures) or multiple types of nesting SEI message structure (e.g., both scalable nesting SEI message structures and bitstream partition nesting SEI message structures).

If it is determined in step 630 that the SEI message structure is a non-nesting SEI message structure, the SEI message structure is parsed conventionally (i.e., as indicated in a current draft of the HEVC specification) in step 640, and process 600 ends in step 680.

On the other hand, if it is determined in step 630 that the SEI message structure is a nesting SEI message structure, the number of SEI message(s) in the nesting SEI message structure is determined in step 650. For example, this number may have been incorporated into the SEI message structure or other structure by a video encoder (e.g., video encoder 20 or video encoder 21) that encoded the nesting SEI message structure, in which case video decoder 30 determines this number by extracting a value of the number from the number's coded position in the nesting SEI message structure or other structure. Alternatively, the number of SEI message(s) in the nesting SEI message structure may be signaled by the video encoder in another manner (e.g., provided through some external means). In either case, the signaled number of SEI message(s) in the nesting SEI message structure may be the actual number of SEI message(s) or the number of SEI message(s) minus one (e.g., the variable "num_seis_in_scalable_minus1" for scalable nesting SEI messages, or the variable "num_seis_in_bsp_minus1" for bitstream partition nesting SEI messages).

In step 660, it is determined whether the determined number of SEI message(s) in the nesting SEI message structure has been parsed. If the determined number of SEI message(s) in the nesting SEI message structure has not been parsed, the next SEI message is parsed in step 670, and process 600 then returns to step 660. On the other hand, if the determined number of SEI message(s) in the nesting SEI message structure has been parsed, process 600 ends in step 680. This loop formed by steps 660 and 670 may be implemented using a "for loop," as discussed above and illustrated by lines 10-11 of Table 3 and lines 06-07 of Table 4. Alternatively, the loop formed by steps 660 and 670 may be implemented using a different type of loop structure.

Figure 7:
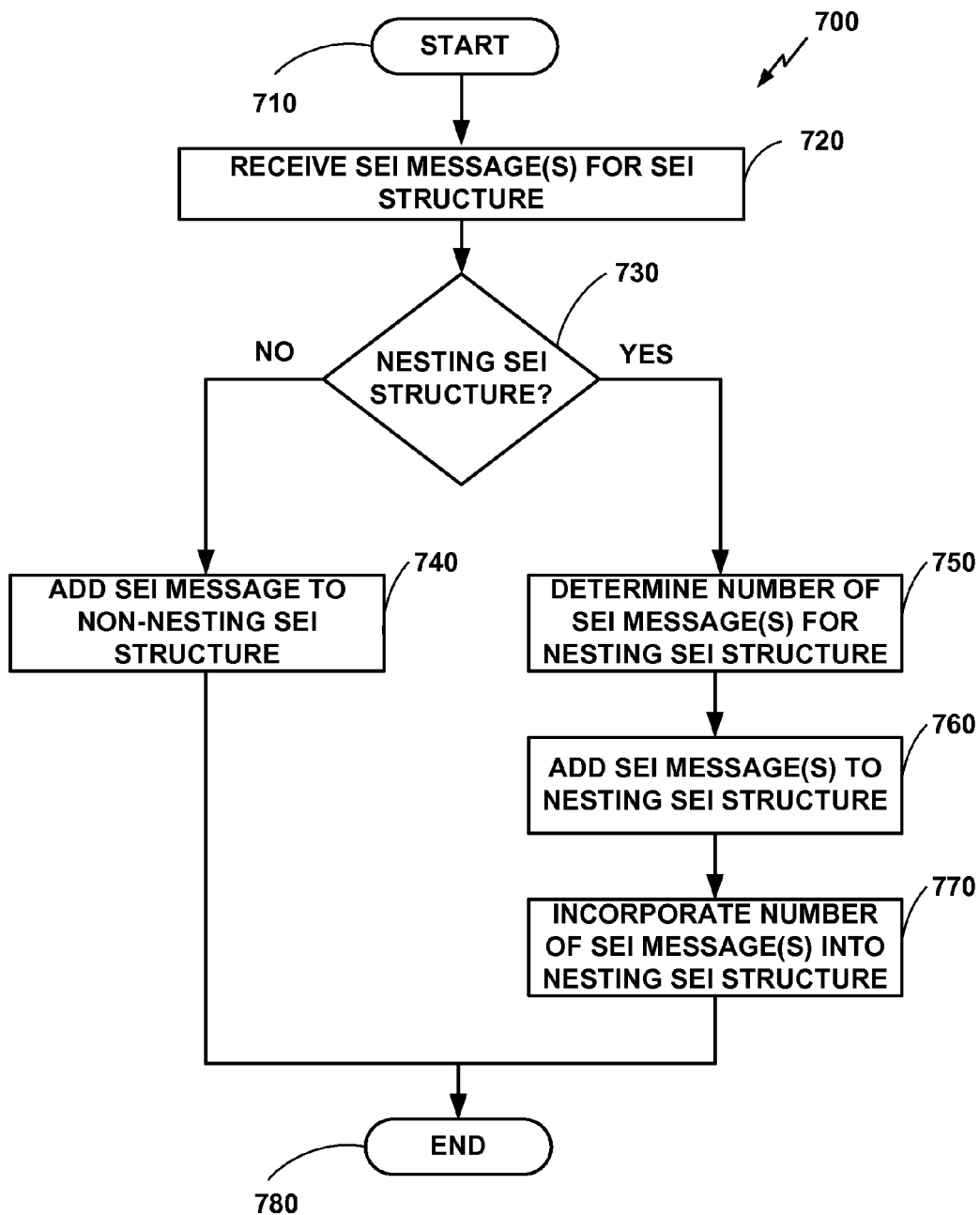
FIG. 7 is a block diagram illustrating an example of a portion of a video encoding process in accordance with aspects described in this disclosure.

FIG. 7 illustrates a process 700 to be used in video encoding, according to various embodiments of the present disclosure. Process 700, which starts in step 710, may be implemented by video encoder 20 and/or video encoder 21, or any other component. In step 720, one or more SEI messages are received for generating an SEI message structure. In step 730, it is determined whether the SEI message structure to be generated is a nesting SEI message structure (e.g., a scalable nesting SEI message structure and/or bitstream partition nesting SEI message structure). It should be understood that step 730 may be performed for only one particular type of nesting SEI message structure (e.g., either scalable nesting SEI message structures or bitstream partition nesting SEI message structures) or multiple types of nesting SEI message structure (e.g., both scalable nesting SEI message structures and bitstream partition nesting SEI message structures).

If it is determined in step 730 that the SEI message structure is a non-nesting SEI message structure, the received SEI message is added to the SEI message structure conventionally (i.e., as indicated in a current draft of the HEVC specification) in step 740, and process 700 ends in step 780.

On the other hand, if it is determined in step 730 that the SEI message structure is a nesting SEI message structure, the number of SEI message(s) to be contained within the nesting SEI message structure is determined (e.g., by counting, parsing, etc.) in step 750. For example, the video encoder may count the number of SEI message(s) while the video encoder is adding the SEI message(s) to the SEI message structure, or may count the number of SEI message(s) prior to adding any SEI message(s) to the SEI message structure. In any case, as represented in step 760, the SEI message(s) are added to (e.g., coded within) the nesting SEI message structure.

In step 770, the number of SEI message(s) determined in step 750 are incorporated into (e.g., coded into) the nesting SEI message structure or other structure. Alternatively, the number of SEI message(s) may be signaled in another manner. In either case, the signaled number of SEI message(s) in the nesting SEI message structure may be the actual number of SEI message(s) or the number of SEI message(s) minus one (e.g., the variable "num_seis_in_scalable_minus1" for scalable nesting SEI messages, or the "variable num_seis_in_bsp_minus1" for bitstream partition nesting SEI messages). Process 700 ends in step 780.

In various embodiments, constraints are added, such that a nesting SEI message structure (e.g., the scalable nesting SEI message structure and/or a bitstream partition nesting SEI message structure) is constrained to be the last SEI message structure in an SEI NAL unit. This constraint may be used in combination with feature(s) of other embodiments of the present disclosure, described above, or as an alternative.

For example, video encoder 20 and/or video encoder 21 may prevent a nesting SEI message structure from being added to a SEI NAL unit at a position that precedes other data (i.e., data other than the RBSP trailing bits structure 450) in the sei_rbsp structure 420. In other words, video encoder 20 may ensure that, if a nesting SEI message structure is added to a SEI NAL unit, the nesting SEI message structure is added after any other SEI message structures in the SEI NAL unit.

In addition, video encoder 20 and/or video encoder 21 may prevent the addition of two or more nesting SEI message structures to a single SEI NAL unit, in order to avoid a situation in which an SEI NAL unit comprises two nesting SEI message structures. In such a situation, one of the nesting SEI message structures would necessarily precede other data (i.e., another nesting SEI message of the two or more nesting SEI message), resulting in a parsing error, as described above.

Figure 8:
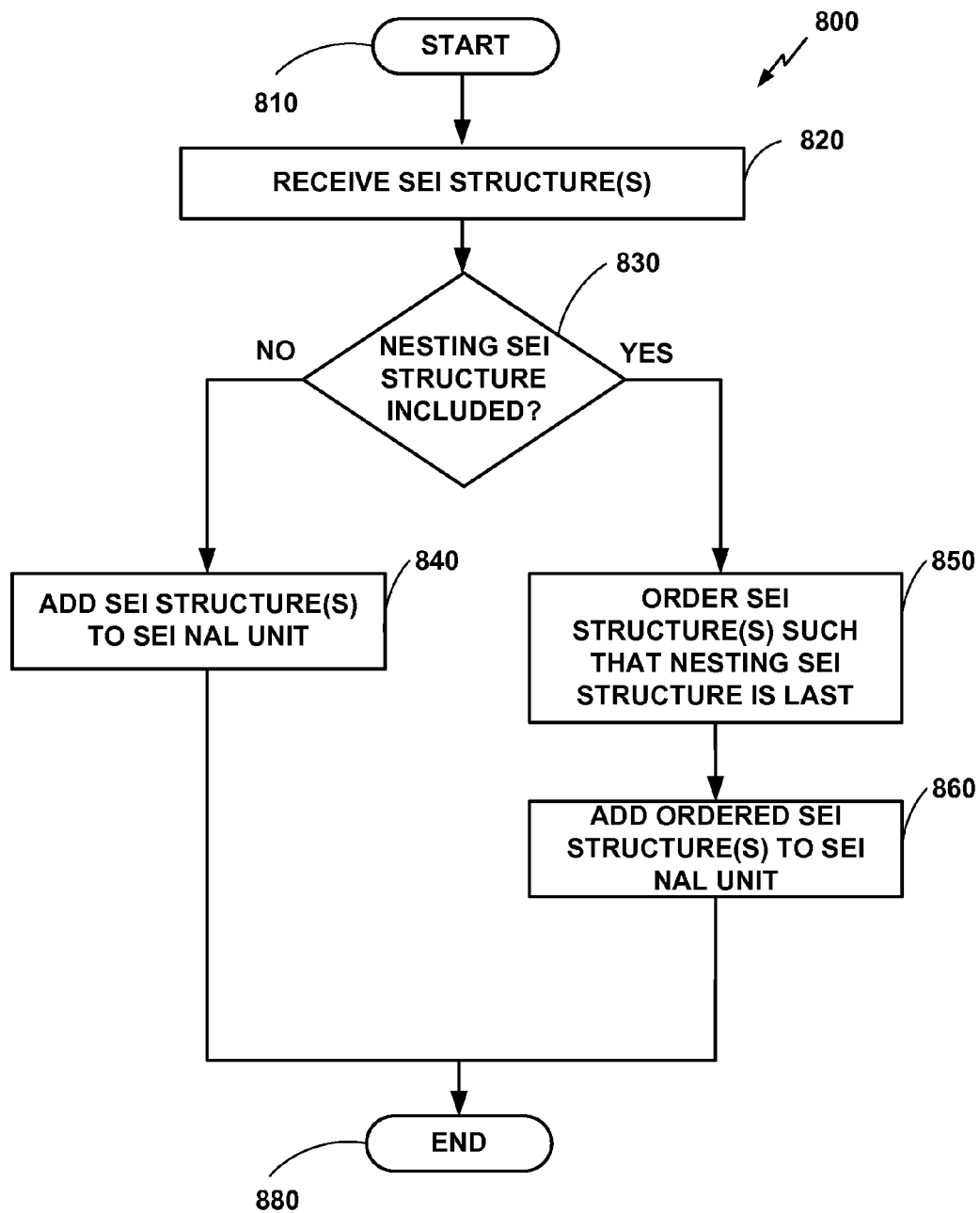
FIG. 8 is a block diagram illustrating an example of a portion of a video encoding process in accordance with aspects described in this disclosure.

FIG. 8 illustrates a process 800 to be used in video encoding, according to various embodiments of the present disclosure. Process 800, which starts in step 810, may be implemented by video encoder 20 and/or video encoder 21, or any other component. In step 820, one or more SEI message structures are received for generating an SEI NAL unit. In step 830, it is determined whether the SEI message structure(s) to be incorporated into the SEI NAL unit include a nesting SEI message structure (e.g., a scalable nesting SEI message structure and/or bitstream partition nesting SEI message structure). It should be understood that step 830 may be performed for only one particular type of nesting SEI message structure (e.g., either scalable nesting SEI message structures or bitstream partition nesting SEI message structures) or multiple types of nesting SEI message structure (e.g., both scalable nesting SEI message structures and bitstream partition nesting SEI message structures).

If it is determined in step 830 that the SEI message structure(s) to be incorporated into the SEI NAL unit do not include any nesting SEI messages, the received SEI message structure(s) are added to the SEI NAL unit conventionally (i.e., as indicated in a current draft of the HEVC specification) in step 840, and process 800 ends in step 880.

On the other hand, if it is determined in step 830 that the SEI message structure(s) to be incorporated into the SEI NAL unit do include a nesting SEI message structure, the SEI message structure(s) received in step 820 are ordered, such that the nesting SEI message structure is last among all of the SEI message structure(s). For example, if four SEI message structures, A, B, C, and D, are received in step 820, and structure C is a nesting SEI message structure, whereas A, B, and D are non-nesting SEI message structures, the structures are ordered such that nesting SEI message structure C is last (e.g., A-B-D-C, B-A-D-C, B-D-A-C, etc.). The order of the non-nesting SEI message structures, A, B, and D, may be determined in any manner (e.g., in the order in which the non-nesting SEI message structures were received, randomly, according to other conditions or parameters, etc.), as long as structures A, B, and D each precede structure C in the order.

After the order of the SEI message structure(s) received in step 820 is determined in step 850, the SEI message structure(s) are incorporated into the SEI NAL unit in the determined order in step 860. It should be understood that the order may be determined prior to adding any of the SEI message structure(s) to the SEI NAL unit. Alternatively, the order may be determined as SEI message structure(s) are being added to the SEI NAL unit, for example, by adding non-nesting SEI messages structures in the order in which the non-nesting SEI message structures were received, but storing a nesting SEI message structure, when encountered, to be added after all other SEI message structures have been added. Process 800 ends in step 880.

Using Payload Size Information in the Parsing of SEI Messages

The SEI message structure (e.g., sei_message( ) 430A or 430B in FIG. 4) comprises a variable "payloadSize" which denotes the number of RBSP bytes in the payload (e.g., sei_payload( ) 440A or 440B in FIG. 4) of the SEI message structure. This number, represented in "payloadSize," includes all of the bytes of the payload, including the bytes in the payload extension (e.g., 444A or 444B in FIG. 4) when present.

However, several SEI message syntax structures include all the payloadSize bytes within the specific SEI message syntax structure, such as recovery_point( ). This leaves no room for any payload extension to be present. The SEI message syntax structures that are currently defined for HEVC and which fall under this category are: filler payload SEI message; user data registered; user data unregistered; reserved SEI message; and Video Parameter Set (VPS) rewriting SEI message.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Various embodiments of the disclosure have been described. These and other embodiments are within the scope of the following claims.

What is claimed is:

1. A method for video coding, the method comprising:
   processing a Supplemental Enhancement Information (SEI) Network Abstraction Layer (NAL) unit, comprising a raw byte sequence payload (RBSP) that comprises at least one bitstream partition nesting SEI message structure containing one or more sei_message( ) syntax structures; and coding, within the at least one bitstream partition nesting SEI message structure or from the at least one bitstream partition nesting SEI message structure, a num_seis_in_bsp_minus1 syntax element, the num_seis_in_bsp_minus1 syntax element plus 1 specifying a number of the one or more sei_message( ) syntax structures contained within the at least one bitstream partition nesting SEI message structure, the num_seis_in_bsp_minus1 syntax element being distinct from the one or more sei_message( ) syntax structures.

2. The method of claim 1, wherein the number of the one or more sei_message( ) syntax structures contained within the at least one bitstream partition nesting SEI message structure comprises a count of the one or more sei_message( ) syntax structures contained within the at least one bitstream partition nesting SEI message structure.

3. The method of claim 1, wherein coding the syntax element comprises decoding the syntax element, and wherein the method further comprises determining the number of the one or more sei_message( ) syntax structures comprised within the at least one bitstream partition nesting SEI message structure based on the decoded syntax element.

4. The method of claim 3, further comprising parsing the at least one bitstream partition nesting SEI message structure based on the determined number of the one or more sei_message( ) syntax structures comprised within the at least one bitstream partition nesting SEI message structure.

5. The method of claim 3, wherein the syntax element is decoded from the at least one bitstream partition nesting SEI message structure.

6. The method of claim 1, wherein coding the syntax element comprises encoding the syntax element, and wherein the method further comprises determining the number of the one or more sei_message( ) syntax structures comprised within the at least one bitstream partition nesting SEI message structure prior to encoding the syntax element.

7. The method of claim 6, wherein the syntax element is encoded into the at least one bitstream partition nesting SEI message structure.

8. A device for video coding, the device comprising:
a memory configured to store video data, and
a processor in communication with the memory, the processor configured to:
process a Supplemental Enhancement Information (SEI) Network Abstraction Layer (NAL) unit associated with the video data, wherein the SEI NAL unit comprises a raw byte sequence payload (RBSP) that comprises at least one bitstream partition nesting SEI message structure containing one or more sei_message( ) structures; and
code, within the at least one bitstream partition nesting SEI message structure or from the at least one bitstream partition nesting SEI message structure, a num_seis_in_bsp_minus1 syntax element, the num_seis_in_bsp_minus1 syntax element plus 1 specifying a number of the one or more sei_message( ) syntax structures contained within the at least one bitstream partition nesting SEI message structure, the num_seis_in_bsp_minus1 syntax element being distinct from the one or more sei_message( ) syntax structures.

9. The device of claim 8, wherein the number of the one or more sei_message( ) syntax structures contained within the at least one bitstream partition nesting SEI message structure comprises a count of the one or more sei_message( ) syntax structures contained within the at least one bitstream partition nesting SEI message structure.

10. The device of claim 8, wherein the processor is further configured to decode the syntax element and to determine the number of the one or more sei_message( ) syntax structures comprised within the at least one bitstream partition nesting SEI message structure based on the decoded syntax element.

11. The device of claim 10, wherein the processor is further configured to parse the at least one bitstream partition nesting SEI message structure based on the determined number of the one or more sei_message( ) syntax structures comprised within the at least one bitstream partition nesting SEI message structure.

12. The device of claim 10, wherein the processor is further configured to decode the syntax element from the at least one bitstream partition nesting SEI message structure.

13. The device of claim 8, wherein the processor is further configured to encode the syntax element and to determine the number of the one or more sei_message( ) syntax structures comprised within the at least one bitstream partition nesting SEI message structure prior to encoding the syntax element.

14. The device of claim 13, wherein the processor is further configured to encode the syntax element into the at least one bitstream partition nesting SEI message structure.

15. The device of claim 8, further comprising a display configured to display the video data.

16. The device of claim 8, wherein the device comprises at least one of:
an integrated circuit;
a microprocessor; or
a wireless communication device.

17. A device for video coding, the device comprising:
means for processing a Supplemental Enhancement Information (SEI) Network Abstraction Layer (NAL) unit associated with the video data, wherein the SEI NAL unit comprises a raw byte sequence payload (RBSP) that comprises at least one bitstream partition nesting SEI message structure containing one or more sei_message( ) structures; and
means for coding, within the at least one bitstream partition nesting SEI message structure or from the at least one bitstream partition nesting SEI message structure, a num_seis_in_bsp_minus1 syntax element, the num_seis_in_bsp_minus1 syntax element plus 1 specifying of a number of the one or more sei_message( ) syntax structures contained within the at least one bitstream partition nesting SEI message structure, the num_seis_in_bsp_minus1 syntax element being distinct from the one or more sei_message( ) syntax structures.

18. The device of claim 17, wherein the number of the one or more sei_message( ) syntax structures contained within the at least one bitstream partition nesting SEI message structure comprises a count of the one or more sei_message( ) syntax structures contained within the at least one bitstream partition nesting SEI message structure.

19. The device of claim 17, wherein the means for coding the syntax element comprises means for decoding the syntax element, and wherein the device further comprises means for determining the number of the one or more sei_message( ) syntax structures comprised within the at least one bitstream partition nesting SEI message structure based on the decoded syntax element.

20. The device of claim 19, further comprising means for parsing the at least one bitstream partition nesting SEI message structure based on the determined number of the one or more sei_message( ) syntax structures comprised within the at least one bitstream partition nesting SEI message structure.

21. The device of claim 19, wherein means for decoding the syntax element decodes the syntax element from the at least one bitstream partition nesting SEI message structure.

22. The device of claim 17, wherein the means for coding the syntax element comprises means for encoding the syntax element, and wherein the device further comprises means for determining the number of the one or more sei_message( ) syntax structures comprised within the at least one bitstream partition nesting SEI message structure prior to encoding the syntax element.

23. The device of claim 22, wherein the means for encoding the syntax element encodes the syntax element into the at least one bitstream partition nesting SEI message structure.

24. A non-transitory computer-readable medium having instructions stored thereon that, when executed, cause one or more processors to:
    process a Supplemental Enhancement Information (SEI) Network Abstraction Layer (NAL) unit, comprising a raw byte sequence payload (RBSP) that comprises at least one bitstream partition nesting SEI message structure containing one or more sei_message( ) structures; and
    code, within the at least one bitstream partition nesting SEI message structure or from the at least one bitstream partition nesting SEI message structure, a num_seis_in_bsp_minus1 syntax element, the num_seis_in_bsp_minus1 syntax element plus 1 specifying a number of the one or more sei_message( ) syntax structures contained within the at least one bitstream partition nesting SEI message structure, the num_seis_in_bsp_minus1 syntax element being distinct from the one or more sei_message( ) syntax structures.

25. The non-transitory computer-readable medium of claim 24, wherein the number of the one or more sei_message( ) syntax structures contained within the at least one bitstream partition nesting SEI message structure comprises a count of the one or more sei_message( ) syntax structures contained within the at least one bitstream partition nesting SEI message structure.

26. The non-transitory computer-readable medium of claim 24, wherein the instructions that cause the one or more processors to code the syntax element comprise instructions that cause the one or more processors to decode the syntax element, and wherein the non-transitory computer-readable medium further comprises instructions that cause the one or more processors to determine the number of the one or more sei_message( ) syntax structures comprised within the at least one bitstream partition nesting SEI message structure based on the decoded syntax element.

27. The non-transitory computer-readable medium of claim 26, further comprising instructions that cause the one or more processors to parse the at least one bitstream partition nesting SEI message structure based on the determined number of the one or more sei_message( ) syntax structures comprised within the at least one bitstream partition nesting SEI message structure.

28. The non-transitory computer-readable medium of claim 26, wherein the instructions that cause the one or more processors to decode the syntax element comprise instructions to decode the syntax element from the at least one bitstream partition nesting SEI message structure.

29. The non-transitory computer-readable medium of claim 24, wherein the instructions that cause the one or more processors to code the syntax element comprise instructions that cause the one or more processors to encode the syntax element, and wherein the non-transitory computer-readable medium further comprises instructions that cause the one or more processors to determine the number of the one or more sei_message( ) syntax structures comprised within the at least one bitstream partition nesting SEI message structure prior to encoding the syntax element.

30. The non-transitory computer-readable medium of claim 29, wherein the instructions that cause the one or more processors to encode the syntax element comprise instructions to encode the syntax element into the at least one bitstream partition nesting SEI message structure.

* * * * *